United States Patent
Kirschey

(12) 
(10) Patent No.: US 6,464,587 B2
(45) Date of Patent: Oct. 15, 2002

(54) RESILIENT SHAFT COUPLING

(75) Inventor: Gerhard Kirschey, Wuppertal (DE)

(73) Assignee: Centa-Antriebe Kirschey GmbH, Haan (DE)

( * ) Notice: Subject to any disclaimer, the term of this patent is extended or adjusted under 35 U.S.C. 154(b) by 0 days.

(21) Appl. No.: 09/810,086

(22) Filed: Mar. 16, 2001

(65) Prior Publication Data

US 2001/0023206 A1 Sep. 20, 2001

(30) Foreign Application Priority Data

Mar. 17, 2000 (DE) .......................... 100 13 412

(51) Int. Cl.⁷ ................................. F16D 3/68
(52) U.S. Cl. .......................... 464/17; 464/92
(58) Field of Search .................. 464/17, 88, 91, 464/92, 96, 99

(56) References Cited

U.S. PATENT DOCUMENTS

| | | | | |
|---|---|---|---|---|
| 1,790,516 A | * | 1/1931 | Williams | .............. 464/92 X |
| 2,779,210 A | * | 1/1957 | Holloway | .............. 74/574 |
| 2,802,353 A | * | 8/1957 | Peirce | .............. 464/91 |
| 3,039,281 A | | 6/1962 | Hartz | |
| 3,509,974 A | * | 5/1970 | Kampert et al. | .......... 464/96 X |
| 3,678,708 A | * | 7/1972 | Ernst et al. | .............. 464/17 |
| 4,389,204 A | | 6/1983 | Walter | |
| 4,929,115 A | * | 5/1990 | Lunke et al. | .............. 464/96 X |

FOREIGN PATENT DOCUMENTS

| | | | |
|---|---|---|---|
| DE | 678 017 | 6/1939 | |
| DE | 1240408 | * 5/1967 | ............. 464/91 |
| DE | 31 09 388 | 9/1982 | |
| DE | 36 16 232 | 11/1987 | |
| DE | 91 00 835 | 5/1991 | |
| DE | 42 15 539 | 11/1993 | |
| GB | 1121009 | 7/1968 | |
| GB | 2 078 907 | 1/1982 | |

* cited by examiner

*Primary Examiner*—Greg Binda
(74) *Attorney, Agent, or Firm*—Herbert Dubno; Andrew Wilford

(57) ABSTRACT

A coupling has a pair of elastomeric rings centered on a common axis and having generally frustoconical inner faces confronting each other and generally planar outer faces extending generally perpendicular to the axis and directed oppositely away from each other. Respective generally planar, rigid, and annular outer plates centered on the axis are bonded to the outer faces. A metallic center body having frustoconical outer faces bonded to the ring inner faces is formed with a plurality of radially throughgoing center passages.

15 Claims, 5 Drawing Sheets

RESILIENT SHAFT COUPLING

FIELD OF THE INVENTION

The present invention relates to a coupling. More particularly this invention concerns a resilient coupling for transmitting torque between a pair of generally coaxial rotatable elements.

BACKGROUND OF THE INVENTION

A standard shaft coupling such as described in British patent document 2,078,907 of Walter or German patent documents 678,017, 3,109,388 of Walter, 3,616,232 of Bohm, 4,215,539 of Kirschey, or 91 000 835 assigned to KTR has a pair of generally coaxial elements one of which is driven and the other of which is connected to a load, and at least one elastomeric body having end faces adhered to the elements so as to transmit torque therebetween while still permitting the rotation axes of the elements to be slightly misaligned. The elastomeric body also serves to smooth out momentary increases or decreases in rotation speed of either the input or output element. Such couplings are typically used to drive a generator or a watercraft propeller from a gasoline or diesel engine.

In the arrangement of above-cited British patent document 2,078,907 of Walter there are two such elastomeric bodies formed as rings each having an outer face lying on a plane perpendicular to the coupling axis and bonded to a respective one of a pair of plates that are rigidly connected together and a frustoconical inner face bonded to outer faces of a multipart element connected via further elastomeric bodies to the other element of the coupling. Such a construction is quite complex and tends to overheat when compensating for substantial misalignment or for irregular input or output speed.

OBJECTS OF THE INVENTION

It is therefore an object of the present invention to provide an improved shaft coupling.

Another object is the provision of such an improved shaft coupling which overcomes the above-given disadvantages, that is which is of relatively simple construction, but which can be sure to run cool even when compensating for considerable misalignment or varying input or output speeds.

SUMMARY OF THE INVENTION

A coupling has according to the invention a pair of elastomeric rings centered on a common axis and having generally frustoconical inner faces confronting each other and generally planar outer faces extending generally perpendicular to the axis and directed oppositely away from each other. Respective generally planar, rigid, and annular outer plates centered on the axis are bonded to the outer faces. A metallic center body having frustoconical outer faces bonded to the ring inner faces is formed with a plurality of radially throughgoing center passages.

Thus this coupling is cooled by air flow through these center passages, at the very core of the chuck where heat buildup is most likely. The cooling is automatic in that as the chuck rotates air in the passages will be driven centrifugally outward, drawing in more cooling air to produce a cooling effect that is roughly proportional to speed, exactly as needed. Furthermore the shape of the elastomeric bodies makes manufacture of the coupling particularly easy, specially when done with laser- or plasma-cutting systems. The center body is cast of a light-metal alloy of high conductivity, aluminum being particularly suitable. The provision of the cooling passages in the cast center body in no way weakens the coupling while allowing the elastomeric bodies to be made solid, that is with no cooling passages.

The center-body outer faces diverge radially inward and extend substantially symmetrically to a center plane bisecting the center body and perpendicular to the axis. The center body is a pair of frustoconical plates having confronting faces formed with radially extending ribs defining the center passages and bearing axially on each other. These plates can be unitary or separate. The elastomeric rings can be of one piece or, for transmitting large torque, formed of several segments. Even the outer plates can be made of separate segments.

In accordance with the invention a one-piece stabilizing ring between the elastomeric bodies bears radially outward on the ribs of the outer plates. A plurality of bolts engage through the center-body plates at the ribs with the stabilizing ring. The stabilizing ring defines with each of the center-body plates an annular gap communicating with the center passages. Furthermore the ribs form a radially inwardly open groove complementarily receiving the stabilizing ring.

Each ring inner face can have an inner portion extending in a plane perpendicular to the axis. This shape is used in a coupling intended for transmitting considerable torque.

A drive hub is rotatable about the axis adjacent one of the outer plates and a flexible membrane plate has an inner periphery connected to the drive hub and an outer periphery fixed to the one outer plate. Such a membrane plate is useful for compensating out small axial and radial misalignments of input and output members connected to the coupling. The membrane plate is formed with axially throughgoing holes communicating with the center passages.

A flywheel is rotatable about the axis adjacent one of the outer plates. A spacer plate sandwiched between the flywheel and the one outer plate forms a plurality of radially through-going outer passages. This spacer plate has an annularly continuous inner portion spaced radially inward of an inner periphery of the one outer plate and a plurality of notch-defining arms sandwiched extending radially outward from the inner portion between the one outer plate and the flywheel. The one outer plate is formed with cutouts aligned between the notch-defining arms and forming outermost portions of the outer passages.

In a system intended for large torque transmission, a drive member is connected to one of the outer plates, a driven member to the center body, and a sleeve is bolted between and fixed to both of the outer plates.

BRIEF DESCRIPTION OF THE DRAWING

The above and other objects, features, and advantages will become more readily apparent from the following description, reference being made to the accompanying drawing in which.

SPECIFIC DESCRIPTION

Figure 1:
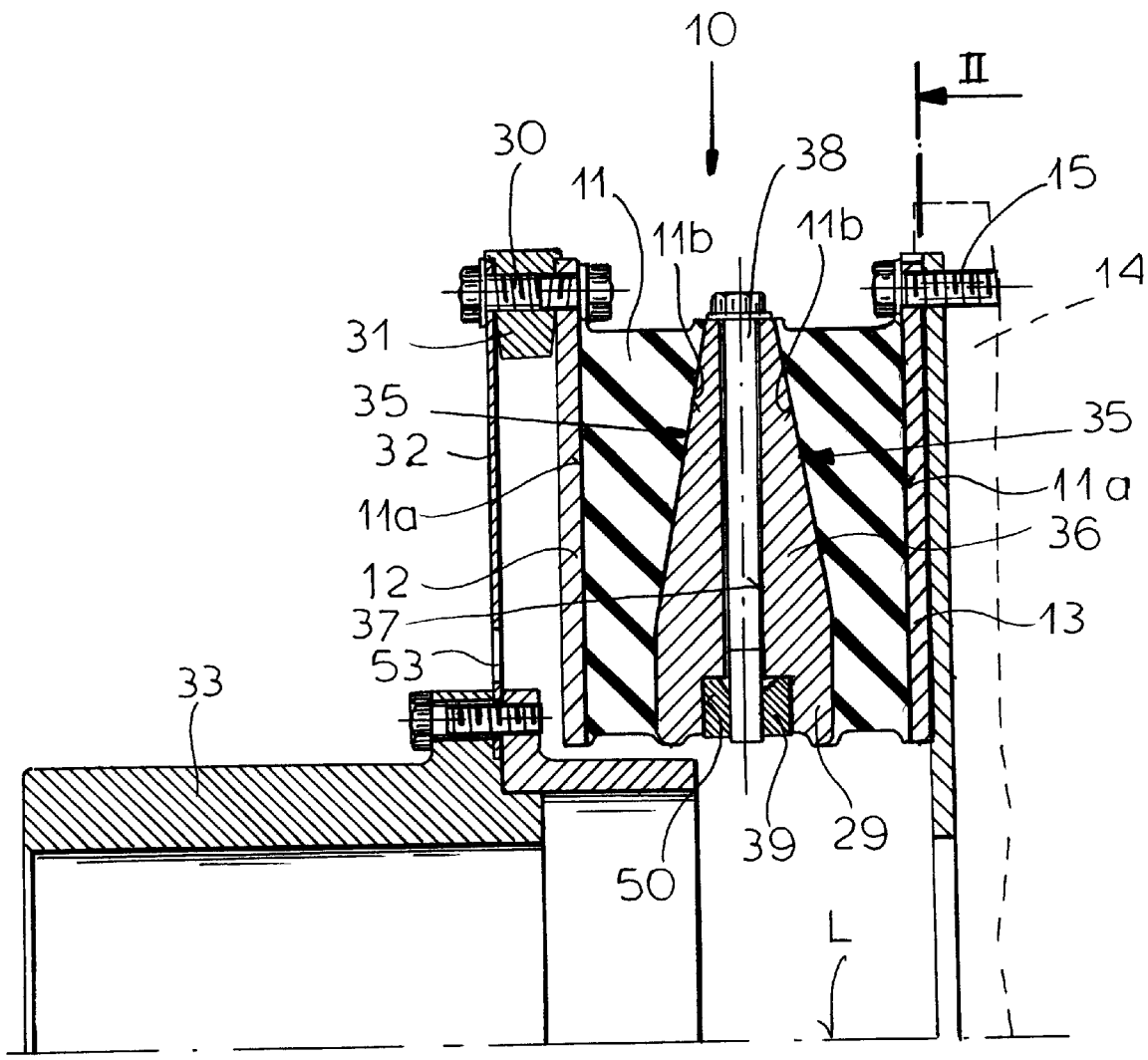
FIG. 1 is an axial section through a coupling according to the invention.
Figure 2:
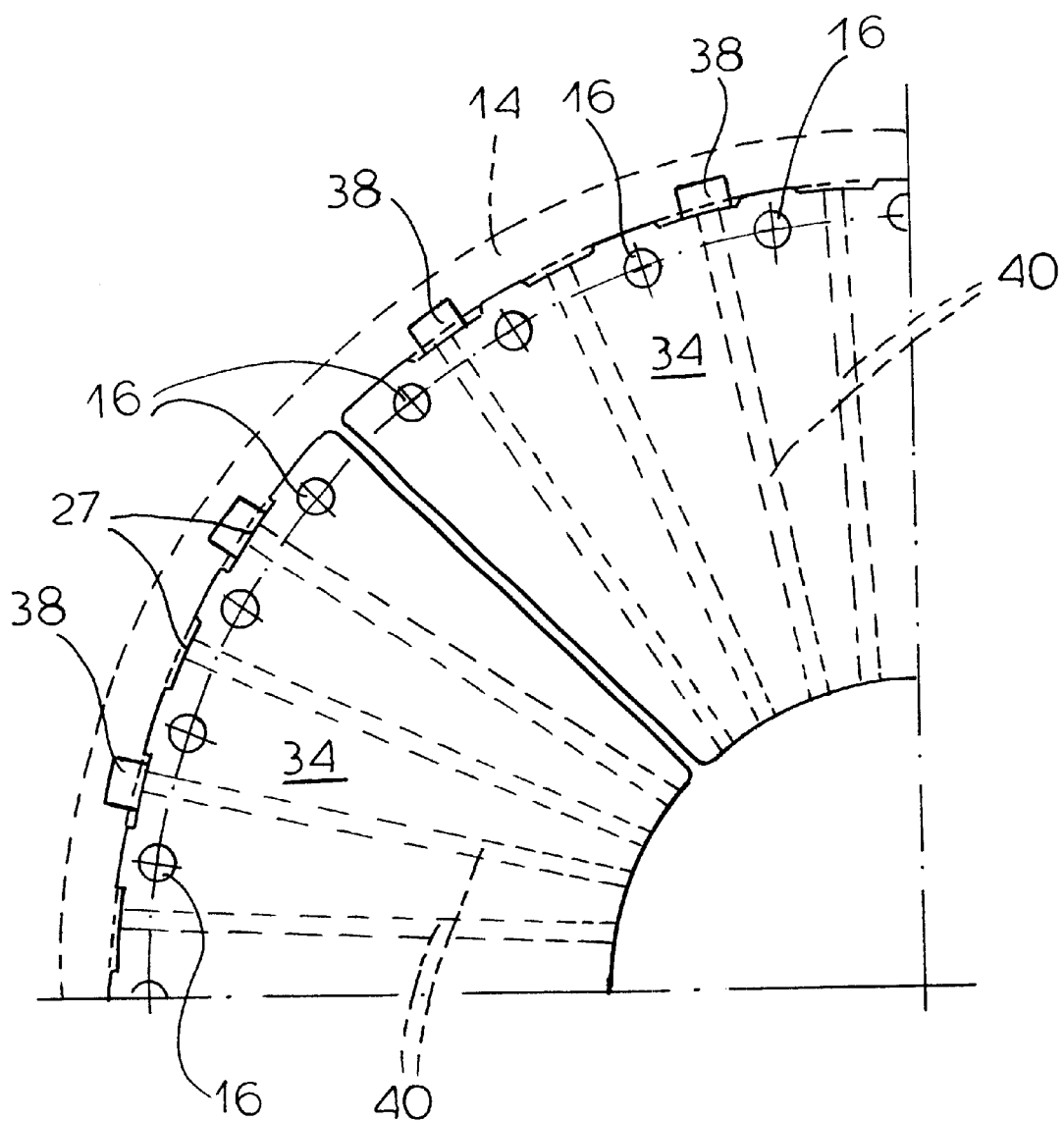
FIG. 2 is a section taken along line II—II of FIG. 1 through a modified coupling.

As seen in FIG. 1 a coupling 10 according to the invention has a pair of elastomeric rings 11 centered on a rotation axis L and of an axial dimension increasing radially outwardly. Each ring 11 has a planar outer face 11a lying in a plane perpendicular to the axis L and vulcanized to a respective annular plate 12 or 13. The plate 13 is secured by screws 15 to a schematically illustrated flywheel 14 rotatable about the axis L. The plate 12 is secured by screws 30 passing through holes 16 to a ring 31 secured by these screws 30 to the outer periphery of a membrane disk 32 whose inner periphery is bolted to a drive hub 33 normally constituted as an engine or transmission output and also rotatable about the axis L. FIG. 2 shows how the rings 11 can be made of individual segments 34, each here extending over about 90° relative to the axis L.

Figure 3:
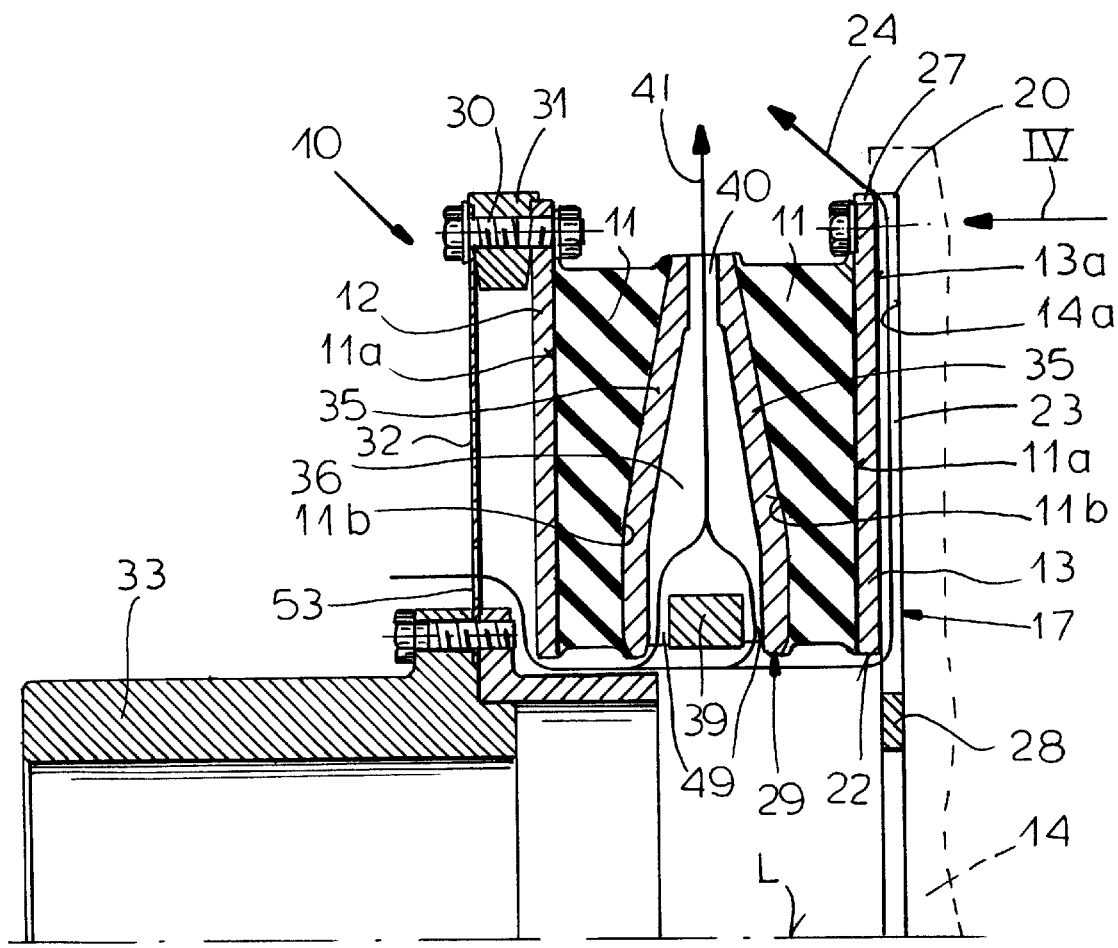
FIG. 3 is an axial section through another coupling in accordance with the invention on a plane offset from that of FIG. 1.

Frustoconical inner faces 11b of the elastomeric rings 11 are vulcanized to outer faces of a center aluminum body or ring 29. FIG. 3 illustrates how the body 29 can be formed by two plates 35 having axially and radially extending ribs 36 that bear axially on each other so as to form a radially throughgoing vent passage 40. A one-piece stabilizing ring 39 is secured to the plates 35 by bolts 38 passing through radially throughgoing holes 37 extending at the ribs 36 through the plates 35 forming the body 29. Radially inner edges of the ribs 36 form a radially inwardly open square-section groove 50 complementarily receiving the stabilizing ring 39. Gaps 49 are formed to each side of the ring 39 between this ring 39 and the plates 35. The membrane plate 32 is also formed with throughgoing vent holes 53 so that air can flow as shown by arrows 41 through the holes 53 of the plate 32, through the gaps 49, along the passages 40, and then out through the center body 29.

Figure 4:
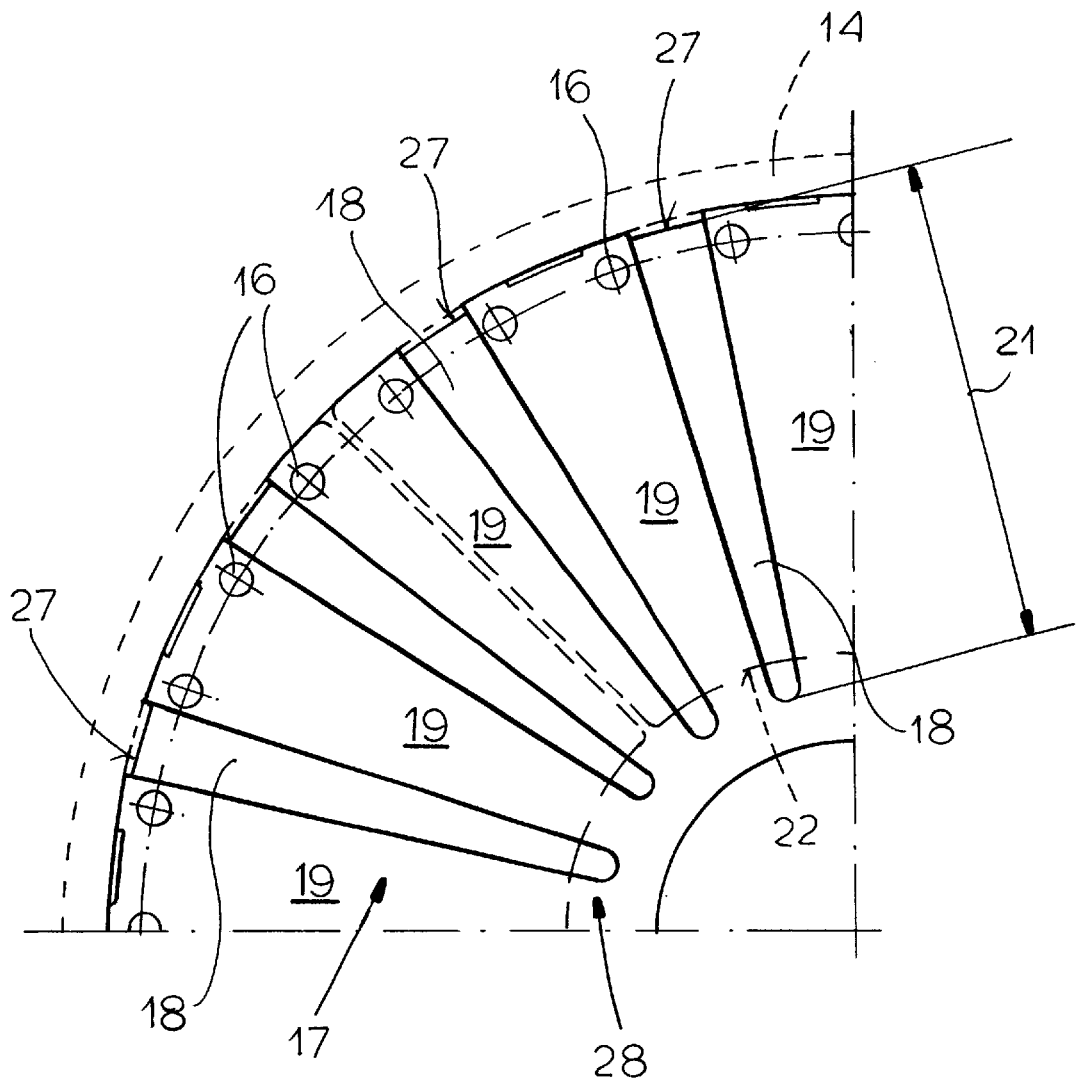
FIG. 4 is an end view taken in the direction of arrow IV of FIG. 3.

In addition as shown in FIG. 3 a spacer plate 17 can be provided between an outer face 13 of the plate 13 and an inner face 14a of the flywheel 14. FIG. 4 shows how this plate 17 has an annularly continuous hub 28 from which extend radially outwardly flaring arms 19 separated by spaces or notches 18 and forming flow passages 23 for air as indicated by arrow 24. To ensure that air can get into the inner ends of the passages 23, the notches 18 have a radial dimension 21 such that they extend 25 past an inner periphery 22 of the plate 13 and the plate 13 is formed with notches 27 that expose and open outer ends of the passages 23, since the spacer plate 17 and plate 13 are set beneath a shoulder 20 of the flywheel 14.

It has been found in practice that the addition of the spacer plate 17 makes the coupling 10 run much cooler. Without the spacer 17 the average temperature is 90° C. while under the same operating circumstances with the spacer 17 the coupling 10 runs at 74° C.

Figure 5:
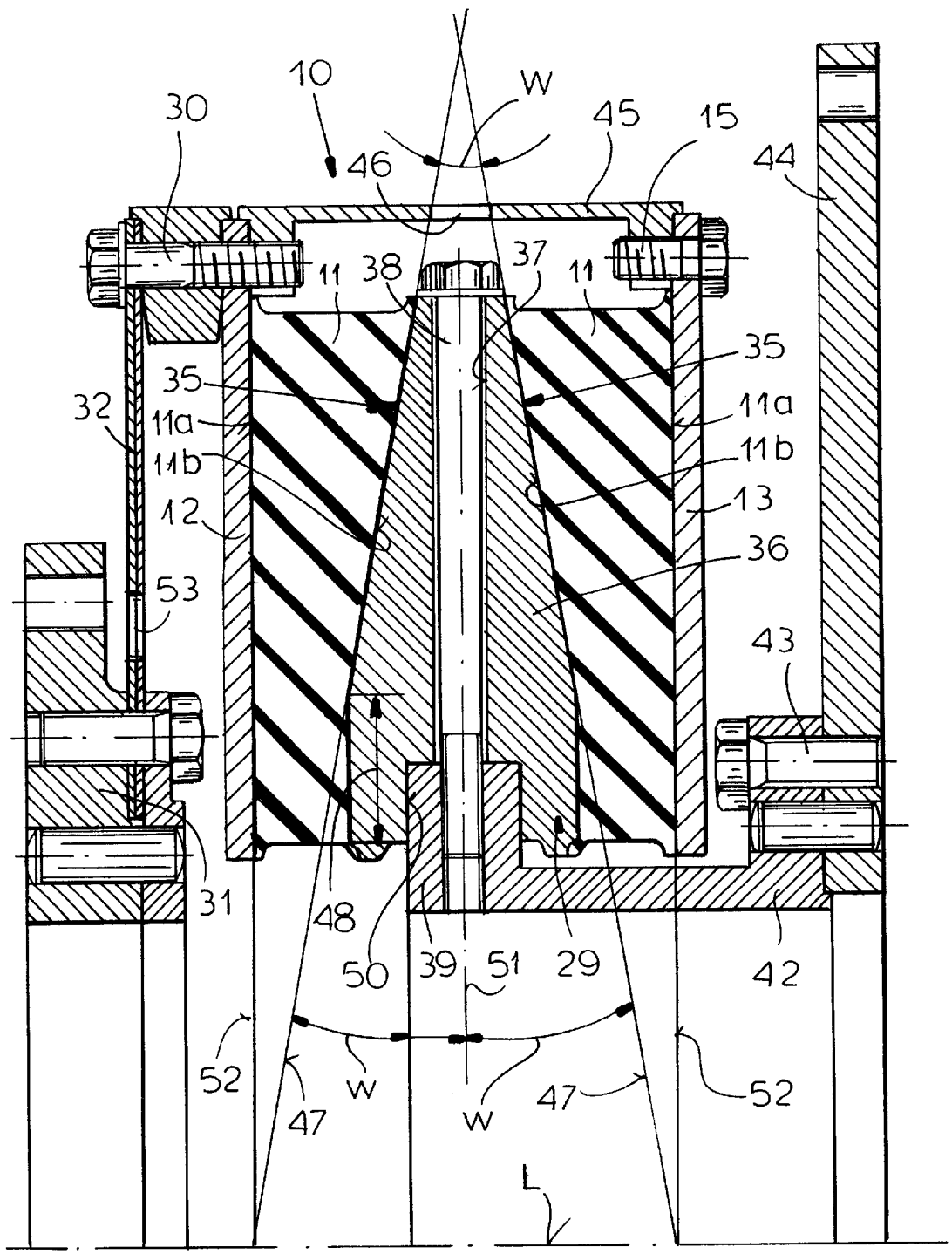
FIG. 5 is an axial section through yet another coupling according to the invention.

FIG. 5 shows a system intended to transmit substantially more torque than the systems of FIGS. 1 through 4. It has a coupling sleeve 45 bolted to the two end plates 12 and 13, and another member 42 forming the ring 39 and connected by bolts 43 to a flywheel 44 so that the two elastomeric bodies 11 are connected in parallel, not in series. Central vent holes 46 are formed in the sleeve 45.

The inner faces 11b of the coupling rings 11 are mainly frustoconical and lie on surfaces 47 form an angle W whose bisector 51 lies on the centers of the screws 38, so that the half angles w are identical. The surfaces 47 intersect the axis L at lines where planes 52 from the respective outer surfaces 11a also intersect this axis L. Somewhat more than the innermost quarter 48 of the surfaces 11b actually lie in planes perpendicular to the axis L.

I claim:
1. A coupling comprising:
a pair of solid elastomeric rings centered on a common axis and having generally frustoconical inner faces confronting each other and generally planar outer faces extending generally perpendicular to the axis and directed oppositely away from each other;
respective generally planar, rigid, and annular outer plates centered on the axis and bonded to the outer faces; and
a heat-conducting metallic center body between the rings, having frustoconical outer faces bonded to the ring inner faces, and formed with a plurality of radially throughgoing center passages.
2. The coupling defined in claim 1 wherein the center-body outer faces diverge radially inward.
3. The coupling defined in claim 2 wherein the center-body outer faces extend substantially symmetrically to a center plane bisecting the center body and perpendicular to the axis.
4. The coupling defined in claim 1 wherein the center body is a pair of frustoconical plates having confronting faces formed with radially extending ribs defining the center passages and bearing axially on each other.
5. The coupling defined in claim 1 wherein each ring inner face has an inner portion extending in a plane perpendicular to the axis.
6. The coupling defined in claim 1 wherein the center body is of aluminum.
7. The coupling defined in claim 1, further comprising:
a drive hub rotatable about the axis adjacent one of the outer plates; and
a flexible membrane plate having an inner periphery connected to the drive hub and an outer periphery fixed to the one outer plate.
8. The coupling defined in claim 7 wherein the membrane plate is formed with axially throughgoing holes communicating with the center passages.
9. The coupling defined in claim 1, further comprising a sleeve bolted between and fixed to both of the outer plates.
10. A coupling comprising:
a pair of elastomeric rings centered on a common axis and having generally frustoconical inner faces confronting each other and generally planar outer faces extending generally perpendicular to the axis and directed oppositely away from each other;
respective generally planar, rigid, and annular outer plates centered on the axis and bonded to the outer faces;
a metallic center body having frustoconical outer faces bonded to the ring inner faces and formed with a plurality of radially throughgoing center passages;
a flywheel rotatable about the axis adjacent one of the outer plates; and
a spacer plate sandwiched between the flywheel and the one outer plate and forming a plurality of radially throughgoing outer passages.
11. The coupling defined in claim 10 wherein the spacer plate has an annularly continuous inner portion spaced radially inward of an inner periphery of the one outer plate and a plurality of notch-defining arms sandwiched extending radially outward from the inner portion between the one outer plate and the flywheel.
12. The coupling defined in claim 11 wherein the one outer plate is formed with cutouts aligned between the notch-defining arms and forming outermost portions of the outer passages.

13. A coupling comprising:

a pair of elastomeric rings centered on a common axis and having generally frustoconical inner faces confronting each other and generally planar outer faces extending generally perpendicular to the axis and directed oppositely away from each other;

respective generally planar, rigid, and annular outer plates centered on the axis and bonded to the outer faces;

a pair of frustoconical plates forming a metallic center body having frustoconical outer faces bonded to the ring inner faces, the plates being formed with radially extending ribs defining a plurality of radially through-going center passages;

a one-piece stabilizing ring between the elastomeric bodies bearing radially outward on the ribs; and a plurality of bolts engaged through the center-body plates at the ribs with the stabilizing ring.

14. The coupling defined in claim 12 wherein the stabilizing ring defined with each of the center-body plates an annular gap communicating with the center passages.

15. The coupling defined in claim 13 wherein the ribs form a radially inwardly open groove complementarily receiving the stabilizing ring.

* * * * *